May 19, 1936.  G. A. GILLEN  2,040,933
GEARING
Filed Aug. 14, 1934  3 Sheets-Sheet 1

George A. Gillen
INVENTOR

BY
ATTORNEY

May 19, 1936.  G. A. GILLEN  2,040,933
GEARING
Filed Aug. 14, 1934  3 Sheets-Sheet 2

George A. Gillen
INVENTOR
BY
ATTORNEY

May 19, 1936.　　G. A. GILLEN　　2,040,933
GEARING
Filed Aug. 14, 1934　　3 Sheets-Sheet 3

George A. Gillen
INVENTOR

Patented May 19, 1936

2,040,933

UNITED STATES PATENT OFFICE 2,040,933

GEARING

George A. Gillen, Bronx, N. Y.

Application August 14, 1934, Serial No. 739,719

2 Claims. (Cl. 74—319)

This invention relates to mechanism for effecting alternate reversals of movement.

Special objects of the invention are to provide apparatus for the purpose, which will be simple, positive and reliable and which will consist of but few, durable parts.

Other objects are to provide special gearing of such character and for the objects mentioned which will be particularly inexpensive and adapted to a wide variety of uses.

The foregoing and other desirable objects are attained by the novel features of construction, combinations, relations and arrangements of parts, all as hereinafter set forth, broadly claimed and illustrated in the accompanying drawings.

In the drawings referred to, several different embodiments of the invention are shown, but as will appear as the invention is understood, the structure may be modified and changed in various ways all within the true intent and broad scope of the claims.

Fig. 1 in the drawings is a broken partial plan view of a form of the invention shown as applied to the operation of an oscillating windshield wiper arm.

The invention consists in principle of a main drive gear designated 10, in the several views, carrying separated groups of teeth as indicated at 11, 12, 13, designed to alternately mesh and drive the coacting groups of teeth 14, 15, on the intermeshing gear elements 16, 17.

Figure 2:
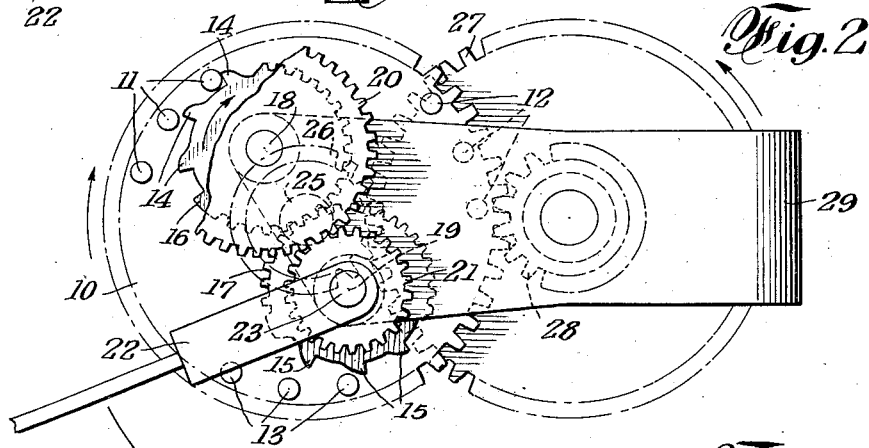
Fig. 2 is a broken front view of the mechanism shown in Fig. 1.

The intermeshing elements 16 and 17 have a 1 to 1 gear ratio and consequently the movement of one will impart an equal, reverse movement to the other. The centers 18, 19, of these elements are so placed at one side of the main gear 10, that at a moment such as indicated in Fig. 2, the first of the one group of teeth 11, on the adjoining side of the main gear will engage the first tooth of the group 14, when the teeth of the formerly driving group 13, have passed out of driving engagement with the teeth 15, of the other reverse gear element 17. Accordingly, then as gear element 16 is rotated right-handedly under drive of the main gear 10, the coupled gear element 17, will be turned left-handedly. In such left-handed rotary movement the element 17 is turned back to bring the teeth 15 into position for meshing engagement by the next group of teeth or driving pins 12 and this actually takes place the moment following the clearing of pins 11 from the teeth 14, substantially as indicated in Fig. 3.

Figure 3:
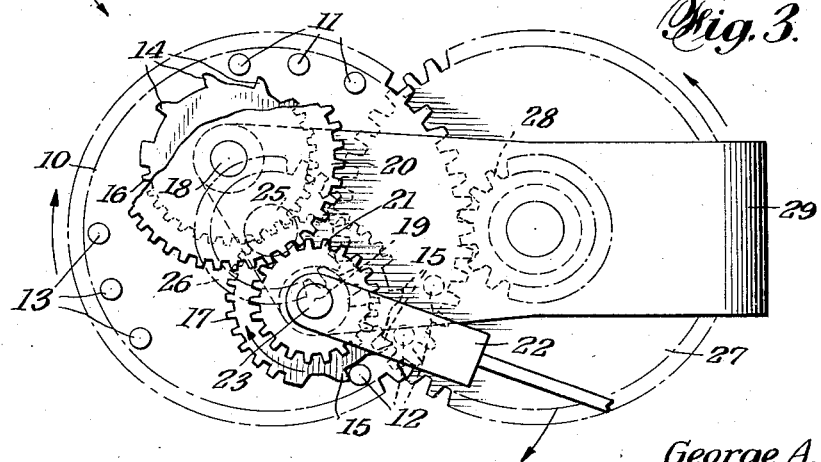
Fig. 3 is another broken front view but showing the parts shifted to the position they occupy at the other extreme of movement of the wiper arm.

In the Fig. 3 position, the driving group 12 on the main gear are engaging and driving the teeth 15 of the lower gear element 17, and consequently rotating that right-handedly. This gear element is in turn rotating the first or upper gear element 16, left-handedly carrying the teeth 14 thereof back into position for driven engagement by the next group of driving teeth 13. Each driven gear therefore when meshed by one set of teeth on the drive gear operates to turn back the other driven gear into position for engagement by the next group of driving teeth, immediately following the departure of the teeth of the first driving group from the gear first driven.

It follows that a member or members connected with the alternately reversing gears may be alternately operated in opposite directions.

Figure 1:
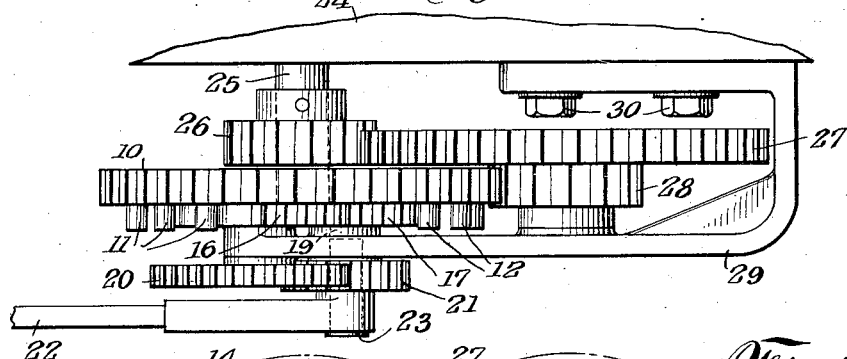

The manner of connection with these reversing gears may depend on the uses to which the invention is put. In the case of windshield wiper operation, such as here shown, the wiper arm may be connected direct with one of the gears, or if increased motion or decreased motion is desired, multiplying or reducing gearing may be interposed between the reversing gears and the wiper arm. The latter case is illustrated in Figs. 1, 2 and 3, where there is shown a larger gear 20, carried by the intermittently acting gear 14, meshing with a pinion 21, carrying the wiper arm 22. In this particular case, the pinion 21 is shown as having the same center as the lower intermittent gear 17, but this it will be evident is not essential, since the pivotal mounting 23, for the wiper arm may be located without respect to the center 19. By properly proportioning the gear train 20, 21, the angle of movement of the wiper arm may be increased or decreased within practical limits, as required. Without such reduction gearing, it will be apparent that with three groups of driving teeth on the main gear and the parts related as shown, the wiper arm or other element will be given a movement of approximately 120°. With motion increasing gearing approximately as illustrated in Figs. 2 and 3, the included angle of movement may be increased to approximately 160°. These figures however are illustrative and not limiting, as actually the motion may be increased to a complete or even several complete revolutions.

Various methods of operating the main drive gear may be employed.

In Fig. 1, an electric motor is indicated at 24, having a shaft 25, carrying a spur pinion 26, in mesh with gear 27, carrying pinion 28, in mesh with the main drive gear 10. Also in this view all parts of the gear set except the motor pinion are shown as mounted on and carried by a special bracket 29, bolted or otherwise suitably secured to the motor frame at 30.

Figure 4:
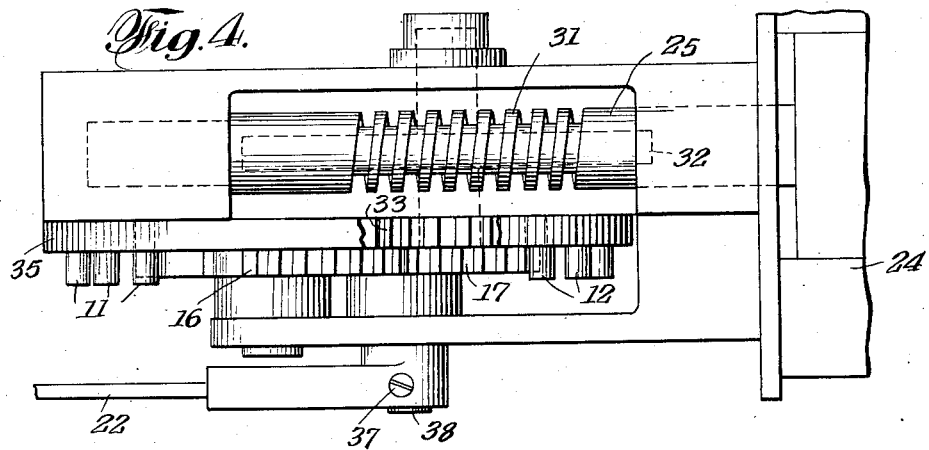
Figs. 4 and 5 are broken plan and front views respectively of another embodiment, involving a worm and gear in place of the spur gear drive in the first form, an internal instead of an external main drive gear and without the motion multiplying gear set of the first form.
Figure 5:
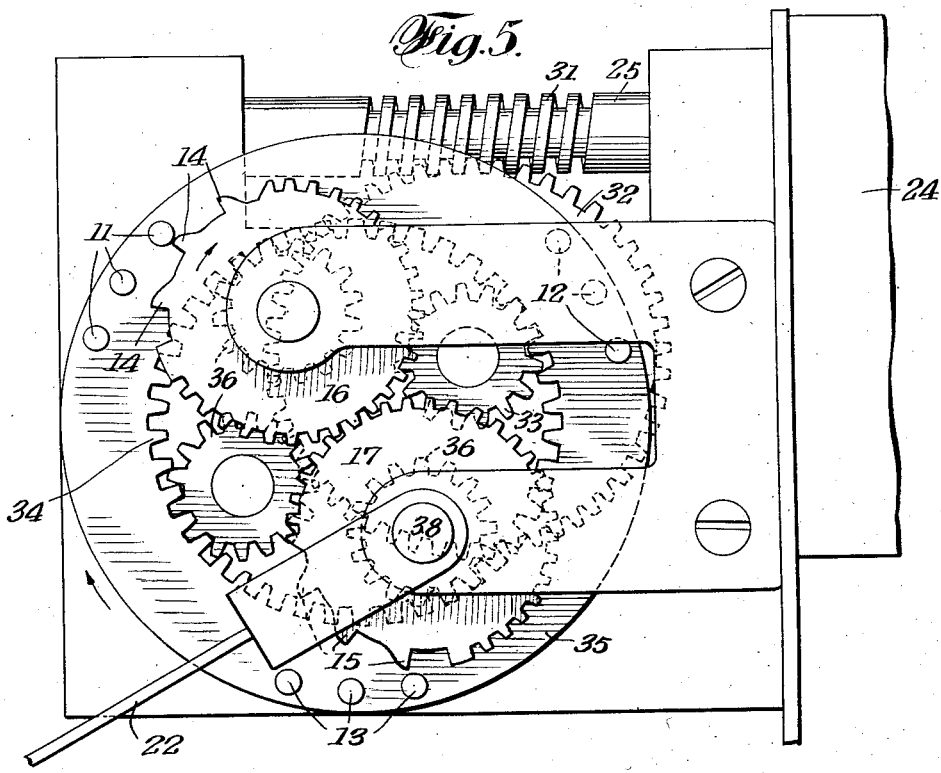

Figs. 4 and 5 illustrate a variation in drive involving a worm 31, on the motor shaft operating a worm gear 32, carrying a pinion 33, in mesh with the internal gear teeth 34, of the main drive gear and which in this instance, is in the form of an annular internally toothed gear member 35, riding on the drive pinion 33 and the three additional idler pinions 36.

Also in the Figs. 4-5 form of the invention, the motion increasing gearing is dispensed with and the wiper arm or blade 22 is shown directly fixed at 37, to the shaft 38, of the lower intermittent gear 17. The wiper blade in this case consequently has an active stroke of approximately 120°, the angle of movement of the reversing gears.

The position of parts in Fig. 5 is different from that of Fig. 2, in that the last driving group 13 of teeth on the main gear has just left the lower gear and the first group 11 has not quite reached the position of engagement with teeth 14, of the upper gear. This view illustrates how the leading tooth or pin of one group, such as 11, will pass over the other teeth of group 14, in order to reach and engage the foremost teeth of group 14.

Figure 6:
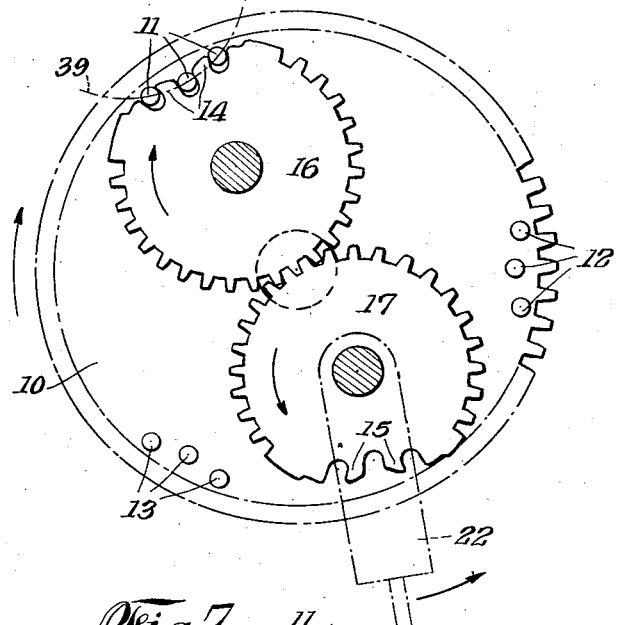
Figs. 6 and 7 are broken and partly diagrammatic views illustrative of modifications in the intermittent drive between the main gear and the coupled reverse motion gears.
Figure 7:
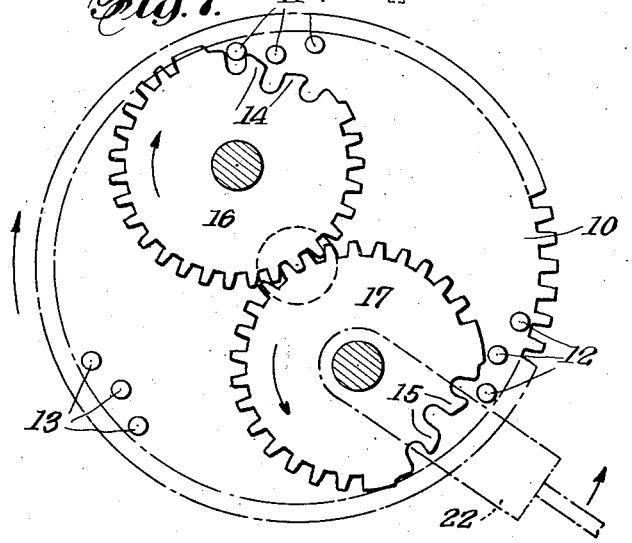

Figs. 6 and 7 illustrate particularly a modification of tooth form or grouping, wherein the teeth of each group 11, 12, 13, on the main drive wheel are arranged on an outwardly facing arc 39, instead of concentrically on the wheel, so as to mesh with a rolling engagement with the correspondingly arcuately disposed teeth 14, 15 of the intermittent gears.

Fig. 6 illustrates the set of teeth 11 driving upper gear 16 and the latter turning gear 17, back into position to be meshed by the next group of teeth 12, while Fig. 7 illustrates the first group 11, near the point of leaving gear 16 and gear 17, turned back nearly far enough for engagement by the approaching set of teeth 12. The arrangement of the driving teeth on an arc, such as indicated, provides favorable leverage for starting and stopping the parts in their reverse movements, it being noted that the pins at the ends of each arcuate group being furthest from the center of the gear which carries them, will engage the teeth of the driven gear at a point further from the center of the driven gear than the intermediate teeth. Other variations in tooth form or grouping may be made to effect different desired results and to produce in all cases, a smooth meshing and unmeshing of driver and driven gears.

The driven gears since they have only a partial rotary movement may be of true gear form throughout their inner meshing periphery and have their outer portions contoured to alternately engage and then free the teeth on the driver. The three equi-distantly spaced groups of teeth provide a desirable movement for windshield wipers and the like, but it will be apparent that this number of tooth groups may be varied to meet special conditions or requirements. Thus there may be only two groups or there may be more than three groups. By using a greater number of teeth in each driving set increased motion may be imparted to the driven gears. The location of the driven gears at diametrically opposite sides of the center of the driver provides a most compact arrangement. It is not essential that the two driven gears directly mesh. By way of example, they may both engage an intermediate sliding rack and the latter may form the member from which the power is taken off. The uneven relation of gear elements as between driving and driven members, such as that illustrated, in which there are three spaced groups 11, 12, 13, of driving elements to two diametrically opposite spaced groups 14, 15, of driven elements, assures the desired alternate reverse action, because when one set of the elements are in mesh as at the top in Fig. 2, the elements 15, at the opposite lower side will be in one of the clear spaces between the driving groups and free to be turned back into the position to be meshed and driven by the next driving group, such as 12 in Fig. 3. The structure of the several parts may vary to suit the different purposes to which the invention is adapted, as contemplated by the intent of the claims.

What is claimed is:

1. Gearing comprising a pair of mutilated gears on adjoining parallel axes and having meshing gear segments on their opposed confronting edges and provided with intermittent gear teeth of different form on their exposed unmeshed edge portions and a driver journalled on an axis between the axes of said mutilated gears and having three sets of equally spaced intermittent gear teeth for alternate engagement with the intermittent gear teeth of said mutilated gears respectively.

2. Gearing comprising an intermeshing pair of driven gear elements on parallel adjoining axes, said gear elements having sets of gear teeth in the rim portions of the same on arcuate pitch lines inwardly concaved toward the respective axes of said gear elements and a common driver for said gear elements operating on a center between the axes of said gear elements having spaced sets of gear teeth arranged on arcuate pitch lines inwardly convexed toward the center of said driver for intermittent meshing engagement with said sets of gear teeth on said gear elements.

GEORGE A. GILLEN.